Nov. 23, 1965  B. W. LEE  3,219,808
ELECTRICAL MULTIPLIER
Filed Sept. 7, 1962  3 Sheets-Sheet 1

INVENTOR.
BOCK W. LEE
BY Lothrop & West
ATTORNEYS

IMPRESSED VOLTAGES ON $N_1$ AND $N_2$

CORE FLUX IN $T_5$

OUTPUT NET WAVE D.C. BEFORE FILTERING

INVENTOR.
BOCK W. LEE

BY Lothrop & West

ATTORNEYS

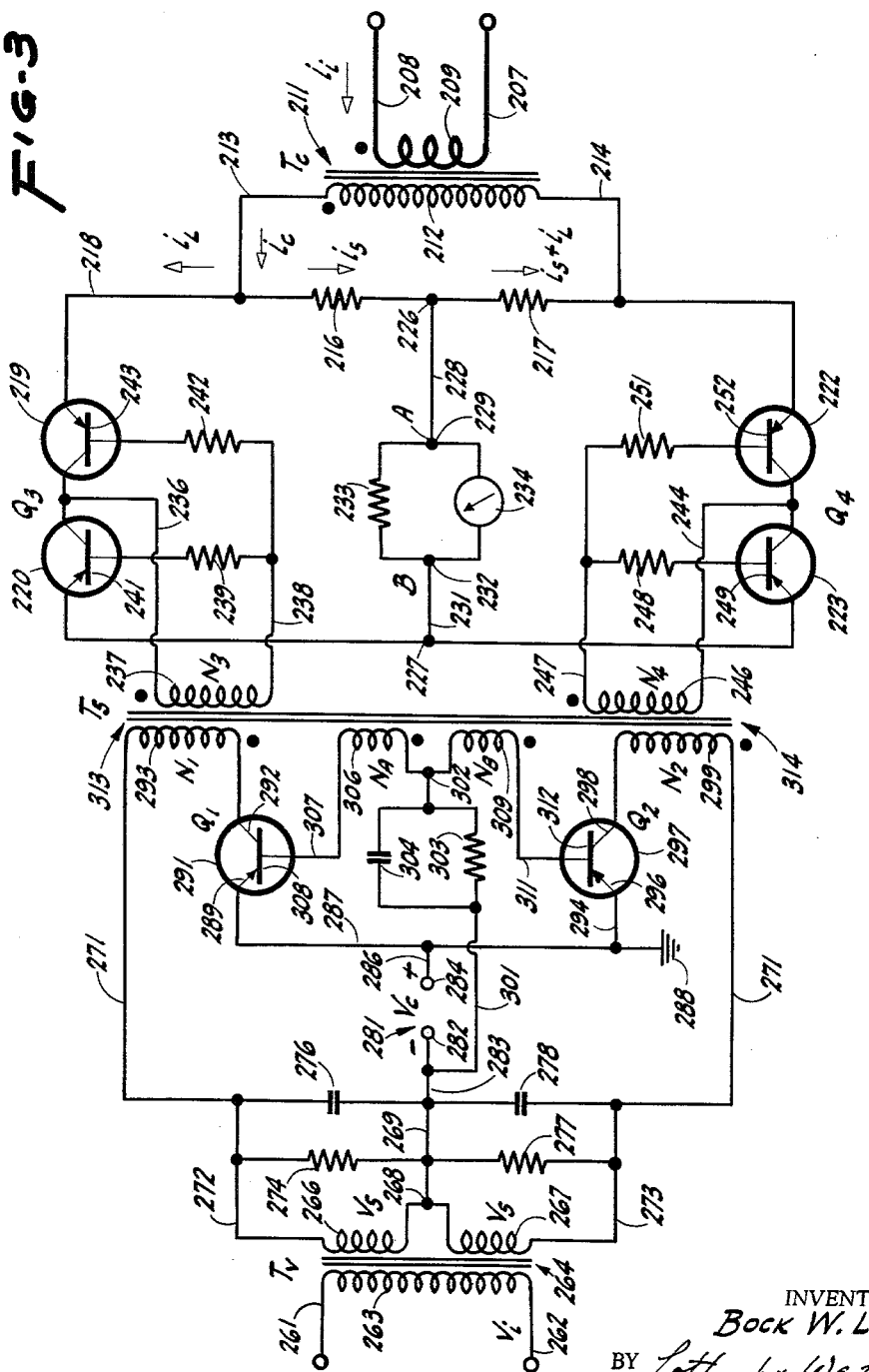

United States Patent Office 3,219,808
Patented Nov. 23, 1965

3,219,808
ELECTRICAL MULTIPLIER
Bock W. Lee, Berkeley, Calif., assignor to
Noller Control Systems, Inc.
Filed Sept. 7, 1962, Ser. No. 221,994
10 Claims. (Cl. 235—194)

My invention relates to a manner of multiplying two factors together by the use of electrical means to produce a product. Customarily the factors involved are electrical quantities such as voltage and amperage and produce a product which can be read from any suitable source of display device such as a meter.

More particularly, the invention relates to a device for taking electrical quantities; for example, the voltage of an alternating current and the amperage of that or another alternating current, and multiplying them together to afford a product indication, i.e. wattage. Under most circumstances, the alternating values are those which have the usual frequency of alternation encountered in normal power line installations, although other frequencies can equally well be used.

Multiplying together quantities, such as voltage and amperage, to furnish an indication of the product, wattage, has heretofore been electrically accomplished only by rather special mechanism subject to variation due to temperature changes and effective to afford a voltage output, for example, measurable only in small quantities such as millivolts requiring amplification for ordinary use. Devices heretofore available are relatively expensive and employ relatively critical or necessarily precise components to obtain the desired accuracy of indication.

An object of the invention, therefore, is to provide an electrical multiplier substantially immune to customary temperature variations and requiring no special temperature compensation.

Another object of the invention is to provide an electrical multiplier in normal embodiment affording an immediate output measurable in volts rather than in millivolts.

A still further object of the invention is to provide an electrical multiplier that is substantially or practically linear over a wide range of input variation.

A still further object of the invention is to provide an electrical multiplier sufficiently versatile as to combine various factors impressed upon the multiplier in terms of electrical value such as voltage and amperage.

Other objects together with the foregoing are attained in the embodiments of the invention described in the accompanying description and illustrated in the accompanying drawings, in which:

FIGURE 3 is a circuit diagram of an electrical multiplier in modified form.

Figure 1:
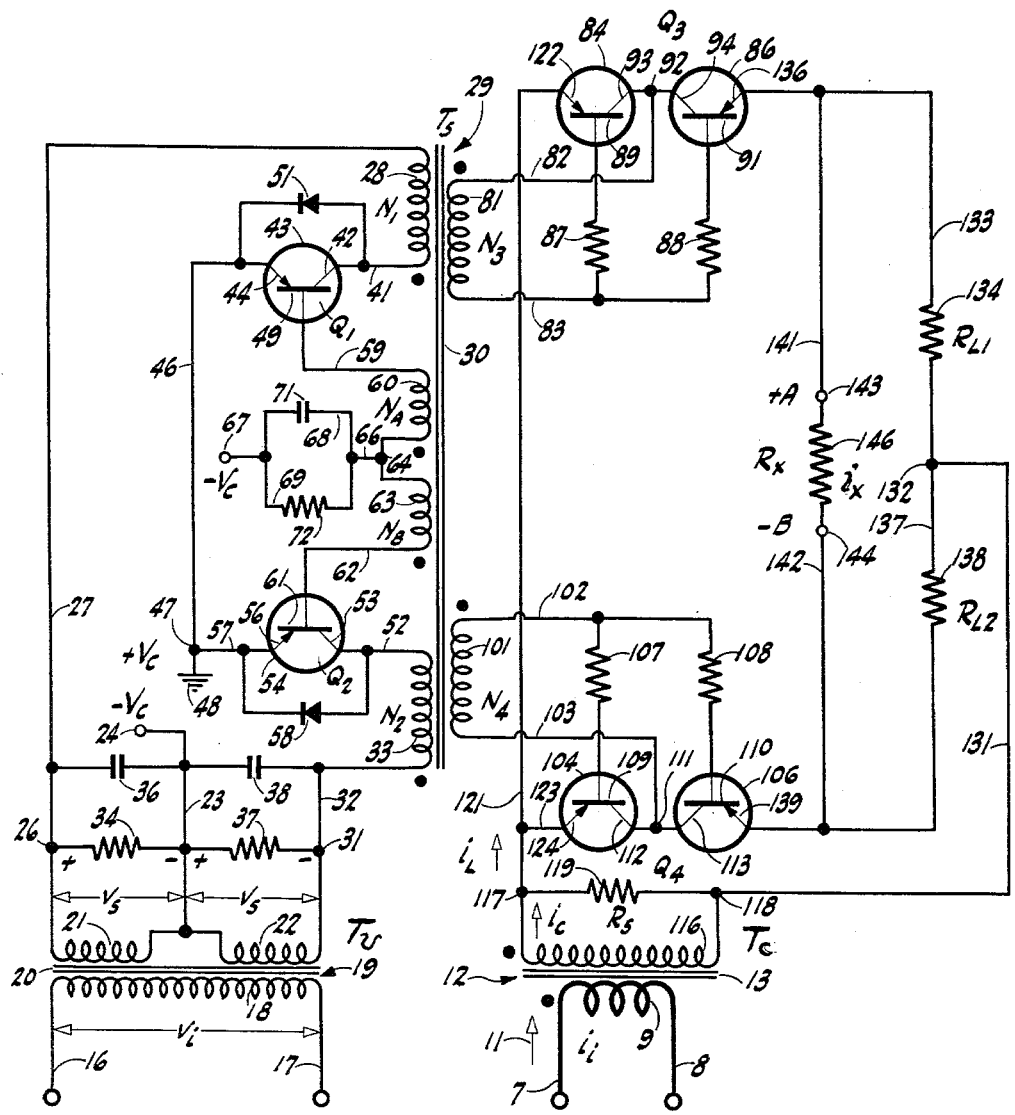
FIGURE 1 is a circuit diagram showing one form of electrical multiplier pursuant to the invention.

In the first form of electrical multiplier, particularly illustrated in FIGURE 1, the arrangement is such as to receive two different electrical input factors. These factors may be voltage, amperage or combinations thereof. The same voltage, for example, can be impressed on both inputs in order that those two input factors when multiplied together afford an indication of the square of the voltage.

As an example herein, there is provided an input current circuit having leads 7 and 8 joined by a primary winding 9 polarized as shown by the dot and through which, for example, a current $i_1$ flows in the instantaneous direction of the arrow 11. The current $i_1$ can be considered as an alternating current having a frequency of 60 cycles per second. The primary winding 9 is part of a transformer 12 and is arranged in magnetic relationship to a transformer core 13.

Similarly, there is also provided a pair of conductors 16 and 17 connected in a circuit and considered as a voltage input $v_1$. The conductors 16 and 17 are joined through a primary winding 18 of a transformer 19 having a core 20. While it is possible that the conductors 7 and 8 are entirely independent of the conductors 16 and 17, it is most often the case that the two pairs of conductors are connected to the same source. By definition the winding 9 is considered as the current coil and the winding 18 is considered as the voltage coil. The voltage and current may be completely in phase or out of phase. For purposes of explanation, the wave of the current $i_1$ in the primary winding 9 is considered to lag the wave of the voltage $v_1$ in the winding 18 in the amount of 30 degrees.

Coupled magnetically to the core 20 of the voltage transformer 19 is a pair of secondary windings 21 and 22 connected with a common lead 23 extending to a terminal 24 at which there is provided a datum voltage $-V_c$ from any suitable regulated supply, not shown. The secondary winding 21 is in all respects equal to the secondary winding 22 and is connected symmetrically with respect to the lead 23, the instantaneous polarizations being related as shown. The secondary winding 21, for example, at one of its terminals 26 is connected by a lead 27 to one end of a primary winding 28 ($N_1$) polarized as the dot indicates and forming part of a main switching transformer 29 ($T_s$) having a core 30 to which the winding 28 is magnetically linked. Similarly, the secondary winding 22 from one of its terminals 31 is joined by a conductor 32 to a primary winding 33 ($N_2$) also magnetically associated with the core 30 and polarized as shown by the dot. Extending between the center conductor 23 and the conductor 27 shunting the winding 21 are a resistor 34 and a capacitor 36. Similarly, shunting the winding 22 between the conductor 23 and the conductor 32 are a resistor 37 and a capacitor 38.

One end of the primary winding 28 is joined by a lead 41 to the collector 42 of a transistor 43 ($Q_1$). The emitter 44 of the transistor 43 is joined by a lead 46 to a datum point 47 of positive voltage $+V_c$ supplied by the voltage supply (not shown). The datum point 47 is connected to a ground 48. The transistor 43 has a base 49 and is shunted by a diode 51.

In a symmetrical disposition with respect to the primary winding 33 and connected thereto by a lead 52 is the collector 53 of a transistor 54 ($Q_2$). The emitter 56 of the transistor is joined by a conductor 57 to the datum point 47 at which the positive voltage $+V_c$ is available. Shunting the transistor 54 is a diode 58.

The base 49 of the transistor 43 is joined by a conductor 59 to one end of a primary winding 60 ($N_A$) also in magnetic relationship with the core 30 and polarized as indicated by the dot. Similarly, the base 61 of the transistor 54 is joined by a lead 62 to one end of a primary winding 63 ($N_B$) polarized as shown by the dot. The two primary windings 60 and 63 are joined at a terminal 64 from whence a lead 66 extends to a terminal 67 whereat the negative voltage $-V_c$ is available. Between the lead 66 and the terminal 67 are parallel conductors 68 and 69. In the first of these a capacitor 71 is interposed, whereas in the second one a resistor 72 is interposed.

In the operation of this portion of the device, the transistor 43 $Q_1$ and the transistor 54 $Q_2$ are alternately turned off and on at a predetermined rate. This rate of alternate effectiveness of the two transistors is arbitrary but is chosen to be very rapid compared to the frequency at which the input voltage $v_i$ across the conductors 16 and 17 and the input current $i_i$ in the conductors 7 and 8 alternates. The predetermined rate of frequency chosen for the alternate operation of the transistors is sufficiently rapid so that other changes in the circuit are so small as to be practically disregarded. Stated differently, the switching operation takes place quickly enough to eliminate from practical consideration any changes which might occur during that interval in other values in the circuitry. While the switching time is measurable and appreciable in some contexts, it is so small relative to other factors as to be properly thought of herein as instantaneous. During the time $T_1$ that the transistor $Q_1$ is conducting or "on," and that the transistor $Q_2$ is nonconducting or "off," the voltage then impressed on the primary winding 28 $N_1$ of the transformer 29 $T_s$ is the bias voltage $+V_c$ available at the point 47 minus the instantaneous or short time average value of the voltage $v_s$ across the secondary winding 21 between the conductor 23 and the terminal 26. Stated differently, the voltage drop $v_s$ is one half of the voltage drop between the terminals 26 and 31 since the windings 21 and 22 are equivalent.

Figure 2A:
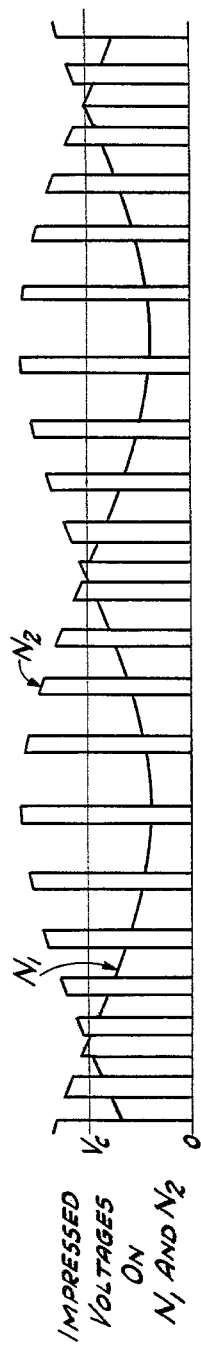
FIGURE 2A is a plot showing variation of voltages in a pair of transformer coils with time.
Figure 2B:
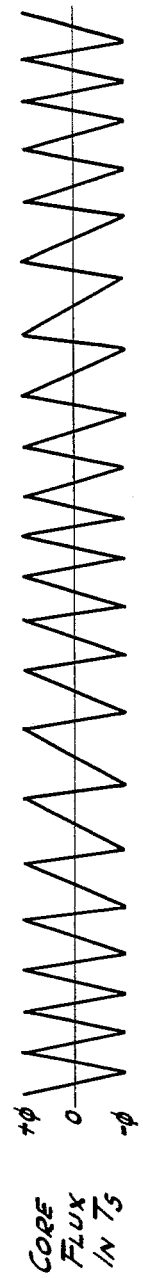
FIGURE 2B is a plot showing variation in flux in a transformer core considered with respect to time.

During the time $T_2$ that the transistor 54 $Q_2$ is on or conducting and that the transistor 43 $Q_1$ is off or nonconducting, the voltage impressed on the winding 33 $N_2$ of the switching transformer 29 $T_s$ is equal to $+V_c$ plus the instantaneous or short time average value of $v_s$. FIGURE 2A shows the voltages on the windings 28 $N_1$ and 33 $N_2$ as they vary with time. Since the windings 28 $N_1$ and 33 $N_2$ alternate in effect and because of their polarized relationship, the magnetic flux in the core 30 of the switching transformer 29 $T_s$ operates preferably from a condition near saturation and varies substantially equal amounts first in one direction and then in the other, depending upon the momentarily impressed voltage. The maximum positive and negative excursions of the flux are equal. FIGURE 2B is an approximate graph of the flux variation with time and is substantially a triangular wave.

Since the times $T_1$ and $T_2$ represent adjacent times in any one complete switching interval, the relationship of impressed voltage, time and flux linkage change during any switching interval is as follows:

$$T_1(V_c - v_s) = 2N_1\phi \quad (1)$$

$$T_2(V_c + v_s) = 2N_2\phi \quad (2)$$

in which $V_c$ is the positive voltage at the datum point 47; $v_s$ is either the voltage difference between the conductors 23 and 27 or 23 and 32, these quantities being equal; $N_1$ represents the number of turns of the winding 28; $N_2$ represents the number of turns of the winding 33; and $\phi$ is the flux of the transformer 29 $T_s$.

In the circuity of FIGURE 1, the design is such that the number of turns $N_1$ in the winding 28 and $N_2$ in the winding 33 are the same. Thus $N_1$ and $N_2$ are identical. It is therefore possible to combine Equations 1 and 2 and write:

$$\frac{v_s}{V_c} = \frac{T_1 - T_2}{T_1 + T_2} \quad (3)$$

It is to be noted that $v_s$ becomes zero when $T_1$ and $T_2$ are equal. It is of practical importance that the value of $v_s$ be such that at no time during operation does it exceed the value of $V_c$. If the requirement is not observed, improper operation results. Since the transistors 43 $Q_1$ and 54 $Q_2$ switch rapidly, the diodes 51 and 58 reduce voltage spikes that would otherwise occur.

During the interval $T_1$, during which time the transistor 43 $Q_1$ conducts, there is induction into a secondary winding 81 $N_3$ polarized as shown by the dot. The resulting current flows through conductors 82 and 83 and is sufficient to render transistors 84 and 86 conducting. This pair of transistors is collectively referred to as $Q_3$. The conductor 83 is joined through resistors 87 and 88 to the bases 89 and 91 respectively of the transistors, whereas the conductor 82 extends to a point 92 joined to the collectors 93 and 94 of these transistors.

Also magnetically linked to the switching transformer 29 $T_s$ is a similar symmetrical arrangement. Another secondary winding 101 $N_4$ polarized as shown by the dot is joined by conductors 102 and 103 to transistors 104 and 106 collectively designated $Q_4$. In this instance the conductor 102 is joined through resistors 107 and 108 to the bases 109 and 110 of the transistors. The conductor 103 extends to a common point 111 joined to the collector 112 of the transistor 104 and to the collector 113 of the transistor 106. Since at the time interval $T_1$ being described the transistor 43 $Q_1$ is on, the transistors 84 and 86 $Q_3$ conduct because the polarity of the secondary winding $N_3$ resulting from the voltage induced therein is proper for conduction. But as the transistor 54 $Q_2$ is off, the polarity of the secondary winding 101 $N_4$ is such that neither of the transistors 104 and 106 $Q_4$ then conducts. During the time interval $T_2$ when the transistor 43 $Q_1$ is off, the winding 81 $N_3$ is polarized against conduction. The transistor 54 $Q_2$ then is conducting to energize the winding 33 $N_2$ to polarize the secondary winding 101 $N_4$ and make the transistors 104 and 106 $Q_4$ conduct. The transistors $Q_3$ and the transistors $Q_4$ conduct alternately, each pair of transistors conducting whenever the other is nonconducting. The time interval for switching between the sets of transistors $Q_3$ and the transistors $Q_4$ is insignificant.

The alternating input current of $i_i$ in a primary winding 9 produces a secondary current $i_c$ in a secondary winding 116 forming part of the transformer 12 $T_c$ polarized as shown by the dot. The terminals 117 and 118 of the transformer are shunted by a resistor 119 $R_s$. The terminal 117 is connected by a conductor 121 to the emitter 122 of the transistor 84 while a branch 123 is connected to the emitter 124 of the transistor 104. At the instant being described, the flow of the current $i_L$ in the conductor 121 is as shown by the arrow in the figure. The other side of the secondary winding 116 is connected at the terminal 118 to a conductor 131 extending to a center tap 132. A branch conductor 133 includes a special resistor 134 $R_{L1}$ and terminates in the emitter 136 of the transistor 86. Symmetrically from the center tap 132 a conductor 137 extends through a special resistor 138 $R_{L2}$ to the emitter 139 of the transistor 106. Shunting the two conductors 133 and 137 across the resistors 134 and 138 are conductors 141 and 142 respectively leading to a positive terminal 143 A and to a negative terminal 144 B. These terminals are joined by a resistor 146 $R_x$, representing the direct current load or output, which may be a suitable meter or indicator.

Since by the operation of the transistors 43 $Q_1$ and 54 $Q_2$ the transistors 84 and 86 $Q_3$ and 104 and 106 $Q_4$ are alternately turned on and off, the current $i_L$ is switched first in one direction and then the other. Pursuant to the alternate operation of the transistors, current is made to flow first in one direction and then the other in the circuit containing the resistors $R_{L1}$, $R_{L2}$ and the output resistance $R_x$. This alternate switching operation controlled by the transistors $Q_3$ and $Q_4$ is readily effected in response to adequate driving current from the secondary winding 81 $N_3$ and 101 $N_4$.

With the polarities shown in FIGURE 1, the output voltage as measured between the points 143A and 144B during time interval $T_1$ is positive and during the adjacent time interval $T_2$ is negative. While in general the various resistors shown are not critical, it is important that the resistors 134$R_{L1}$ and 138$R_{L2}$ and the resistor 119$R_s$ have a low inductance and a low temperature coefficient. Furthermore, the resistors 134$R_{L1}$ and 138$R_{L2}$ are identical in properties. Because of this identity, they can be interchangeably represented by the symbol $R_L$. Because at all times either the circuit portion controlled by the transistors $Q_3$ or the circuit portion controlled by the transistors $Q_4$ is conducting and the voltage drop in either portion is negligible, it is proper to say that the equivalent resistance $R_{eq}$ encountered by the current $i_L$ is independent of the particular transistor $Q_3$ or $Q_4$ which happens to be conducting at any particular instant. This resistance is the equivalent parallel resistance of $R_L$ (as just defined) and of the quantity $(R_L+R_x)$, as follows:

$$R_{eq}=\frac{R_L(R_L+R_x)}{2R_L+R_x} \quad (4)$$

The output voltage across the terminals 143 and 144; that is, across the terminals A and B, is represented as $v_{AB}$ and during the time interval $T_1$ is developed by that fraction of the current $i_L$ flowing through $R_x$ during the time interval $T_1$ and is positive. Comparably, during the time interval $T_2$, the fraction of the current $i_L$ flowing through $R_x$ is reversed in direction so that the voltage $v_{AB}$ is negative during the time interval $T_2$. The indicated fraction of the current flowing through the resistance $R_x$ is represented by $i_x$ and in terms of the principal current $i_L$ is:

$$i_x=i_L\frac{R_L}{2R_L+R_x} \quad (5)$$

Figure 2C:
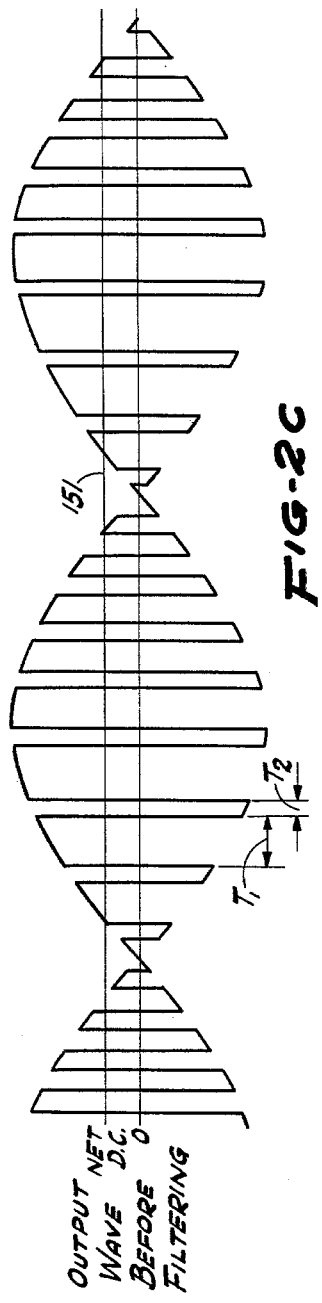
FIGURE 2C is a plot showing a form of output wave of the electrical multiplier prior to filtering, the plot being measured in instantaneous current against time.

The wave form of the output voltage $v_{AB}$ as developed across $R_x$ is indicated in FIGURE 2C. It has been stated that in this example the current is out of phase with the voltage by a phase angle of 30 degrees. FIGURE 2C shows the current wave of the current $i_i$ in the input conductors 7 and 8 and also the current wave $i_L$ flowing in the conductor 121 lagging the voltage wave $v_i$ and the voltage wave $v_s$ at the indicated phase angle. When these waves are in their unfiltered form the maximum excursion of the current wave occurs 30 degrees later than the maximum and minimum excursions of the voltage waves impressed upon the primary winding $28N_1$ and the primary winding $33N_2$. Ordinarily, the output is not left unfiltered, but rather is appropriately filtered by any standard means and produces a filtered output as indicated by the straight line 151 in FIGURE 2C representing the net direct current output, usually displayed as a meter reading.

During the time interval $T_1$ the voltage at the terminals 143A and 144B is $i_xR_x$ and during the time interval $T_2$ it is $-i_xR_x$. The average or net output voltage value $v_{AB}$ is the sum of the product of each voltage times its respective time interval and that sum divided by the sum of the two time intervals, thus:

$$v_{AB}=i_xR_x\frac{(T_1-T_2)}{(T_1+T_2)} \quad (6)$$

This net value is correct when $T_1$ and $T_2$ are adjacent time intervals in any selected complete cycle or switching interval, as illustrated in FIGURE 2C.

By substituting the left-hand member of Equation 3 for the parenthetical right-hand portion of the Equation 6, there is derived:

$$v_{AB}=i_xR_x\frac{v_s}{V_c} \quad (7)$$

The voltage $v_s$ appearing in Equations 2 and 3 can be expressed in terms of the input voltage $v_i$ across the conductors 16 and 17, and in terms of the turns ratio $N_V$ of the voltage transformer $19T_v$ is:

$$v_s=\frac{v_i}{2N_V} \quad (8)$$

$N_V$ being the ratio of the total primary turns to the total secondary turns of the transformer $19T_v$.

Substituting this valve (Equation 8) for the term $v_s$ in Equation 7 yields:

$$v_{AB}=\frac{i_xR_xv_i}{2V_cN_V} \quad (9)$$

In relating $i_x$ to $i_i$, first $i_L$ is related to $i_i$ and then from Equations 4 and 5, $i_x$ is related to $i_i$. The current in the secondary winding 116 of the current transformer $12T_c$ represented by $i_c$ is:

$$i_c=\frac{i_i}{N_c} \quad (10)$$

where $N_c$ is the ratio of the secondary turns of the transformer $12T_c$ to the primary turns thereof. Further, the current $i_L$ flowing in the conductor 121 is as follows:

$$i_L=i_c\frac{R_s}{R_{eq}+R_s} \quad (11)$$

Substituting the value of $i_c$ from Equation 10 yields the following:

$$i_L=\frac{i_iR_s}{N_c(R_{eq}+R_s)} \quad (12)$$

Substituting this expression of $i_L$ in Equation 5 yields for the value of $i_x$ the following:

$$i_x=\frac{i_i(R_sR_L)}{N_c(R_{eq}+R_s)(2R_L+R_x)} \quad (13)$$

Then taking the value of $R_{eq}$ from Equation 4 the value of $i_x$ can be expressed as:

$$i_i=\frac{i_iR_sR_L}{N_c\left[\frac{R_L(R_L+R_x)}{2R_L+R_x}+R_s\right](2R_L+R_x)} \quad (14)$$

which can be written as:

$$i_x=\frac{i_iR_sR_L}{N_c[R_L(R_L+R_x)+R_s(2R_L+R_x)]} \quad (15)$$

The foregoing value for $i_x$ can then be introduced into Equation 9 which yields for the value of $v_{AB}$ the following:

$$v_{AB}=\frac{i_iv_i}{2V_cN_vN_c}\left[\frac{R_sR_LR_x}{R_L^2+R_LR_x+2R_sR_L+R_sR_x}\right] \quad (16)$$

If $R_W$ represents the term within the brackets, Equation 16 can be represented as:

$$v_{AB}=\frac{i_iv_i}{V_c}\left(\frac{1}{2N_vN_c}\right)R_W \quad (17)$$

It will be noted that in any one particular circuit the value $V_c$ is established by the regulated power supply, the value $N_v$ is fixed as it is a ratio of transformer winding turns for the transformer $19T_v$, the value of $N_c$ is known because it is the ratio of turns of the windings in the transformer $12T_c$ and furthermore the values represented by $R_W$ are all known resistor values.

Since the relationship represented in Equation 17 is rounded on a single switching cycle represented by the juxtaposed time intervals $T_1+T_2$ as set forth in Equation 3, then it follows that the net output voltage $v_{AB}$ during that selected single switching cycle or interval is proportional for this very short time (approximately instantaneous) to the values during that time of the product of the input voltage $v_i$ across the conductors 16 and 17 and the input current $i_i$ across the conductors 7 and 8. Thus, as shown in Equation 17, this circuitry in effect multiplies the input voltage $v_i$ by the input current $i_i$ and yields as a product the voltage across the terminals 143A and 144B represented as $v_{AB}$.

The electrical factor or value introduced by the conductors 16 and 17 is multiplied by the electrical factor or quantity introduced by the conductors 7 and 8 to produce their product as represented by the voltage appearing across the terminals A and B. The circuit thus multiplies these quantities and if they are different in kind nevertheless represents their product, whereas if they happen to be of the same kind and value their square is represented. Furthermore, if there is a phase difference between the input by the conductors 16 and 17 and the input by the conductors 7 and 8, the product displayed at A and B corresponds thereto.

It may be desired to determine the average value of $v_{AB}$ for 1/60 of a second (for the 60 cycle input assumed) for any complete cycle of alternation. For this the product of $i_i$ and $v_i$ is averaged for the time of one cycle and to divide and multiply by the constants in Equation 17, for:

$$i_i = \sqrt{2}\, I \sin(\omega t + \theta) \tag{18}$$

and $$v_i = \sqrt{2}\, V \sin \omega t \tag{19}$$

wherein $\omega$ is $2\pi$ times the frequency and $\theta$ is the phase angle.

$$V_{AB} = \frac{VI \cos \theta}{V_c} \left(\frac{1}{2N_v N_c}\right) R_W \tag{20}$$

wherein $V_{AB}$ is in volts and $\cos \theta$ is power factor.

In an actual example, the component values are as follows: primary winding 18, 1560 turns; each of the secondary windings 21 and 22, 50 turns; each resistor 34 and 37, 120 ohms; each capacitor in 36 and 38, 0.27 microfarad; the regulated power supply (not shown), 8 volts at 13 to 18 milliamperes the diodes 51 and 58, silicon pulse diodes; the transistors $Q_1$, $Q_2$, $Q_3$ and $Q_4$ are each 2N404. The primary windings 28 and 33 are each 100 turns, whereas the primary windings 60 and 63 are 50 turns. The capacitor 71 is 330 micromicrofarads. The resistor 72 is 18K. The secondary windings 81 and 101 each have 100 turns. The resistors 87, 88, 107 and 108 are each 1.2K. The resistors 134 and 138 are each 2000 ohms. The resistor 119 is 200 ohms. The primary winding 9 of the transformer 12 has 28 turns, whereas the second winding 116 has 2090 turns. The output load resistor 146 is represented as 2500 ohms. In the actual example, when a calibrated watt meter indicates an input of 500 watts, the output voltage measured across 143 A and 144 B is 2.5 volts D.C.

The accuracy of measurement of input power depends upon the precision or degree to which the phase angles of transformers 19 $T_v$ and 12 $T_c$ match each other. Accuracy also depends upon the degree to which resistor 134 $R_{L1}$ and resistor 138 $R_{L2}$ approach identity in properties. The calibration of the circuit can be altered by adjusting the resistor 119 $R_s$.

It is possible to revise the circuit and interchange certain portions so that the input $i_c$ and the output $i_x$ are interchanged. This is illustrated in FIGURE 3. The D.C. output voltage is given by Equation 20 but with $R_W$ being replaced by the term $$\frac{R_s R_L}{R_s + R_L}$$

In the FIGURE 3 arrangement the current input $i_1$, represented by an arrow, is derived from conductors 207 and 208 connected to a primary winding 209 of a transformer 211 $T_c$, polarized as shown by the dot. A secondary winding 212 of the current transformer, polarized as shown by the dot, is joined by leads 213 and 214 shunting two resistors. One resistor 216 carries a current $i_s$ having the sense indicated. The other resistor 217 carries a current $i_s + i_L$ as shown. These currents occur because the principal current $i_L$ has the sense shown in a circuit including a conductor 218 forming a loop. Connected by the conductor 218 are transistors 219 and 220 together referred to as $Q_3$ and transistors 222 and 223 together referred to as $Q_4$. Extending between center taps 226 and 227 is an output circuit including a conductor 228 going to an output terminal 229 A and a conductor 231 going to an output terminal 232 B. Between the output terminals there is represented a load resistance 233 and a meter 234, the output or load resistance being represented by $R_L$.

Substantially as before, the conductor 218 between the transistors 219 and 220 branches to a conductor 236 joined to a secondary winding 237 $N_3$ having a return connector 238 extending through a resistor 239 to the base 241 of the transistor 220 and also extending through a resistor 242 to the base 243 of the transistor 219. Similarly, between the transistors 222 and 223 there is a branch 244 extending through a secondary winding 246 $N_4$, the return being through a conductor 247 connected through a resistor 248 to the base 249 of the transistor 223 and also connected in parallel through a resistor 251 to the base 252 of the transistor 222.

The voltage input $v_i$ is derived from conductors 261 and 262 joined by a primary coil winding 263 of a transformer 264 $T_v$. The output of this transformer is through two equal secondary windings 266 $v_s$ and 267 $v_s$ having the characteristics heretofore stated. The corresponding ends of the transformer secondary windings 266 and 267 are joined at a common point 268 by a conductor 269 which leads to a loop conductor 271. The other end of the winding 266 is joined by a lead 272 to the loop conductor 271, whereas the other end of the coil 267 is joined by a lead 273 to the loop conductor 271. Shunting the winding 266 is a resistor 274 and a capacitor 276 in parallel and comparably shunting the winding 267 is a resistor 277 and a capacitor 278 in parallel.

A regulated power supply 281 $V_c$ (not illustrated in detail) affords a voltage value of $-V_c$ at a terminal 282 connected to the loop conductor 271 by a lead 283 and positive voltage $V_c$ is available at a terminal 284 connected by a lead 286 to a conductor 287 one end of which goes to ground 288. Another portion of the conductor 287 leads to the emitter 289 of a transistor 291, the collector 292 of which is joined to one end of a primary coil 293 $N_1$. The other end of the primary coil 293 is joined to the loop conductor 271. Comparably, from the conductor 287 there is a connection 294 to the emitter 296 of a transistor 297. The collector 298 of the transistor is joined to a primary winding 299 $N_2$, the other end of which is joined to the loop conductor 271. The power supply $-V_c$ available at the conductor 283 is also supplied through a lead 301 to a center tap 302 through a branched circuit including a resistor 303 and a capacitor 304. The center tap 302 is at one end of a primary coil 306 $N_A$, the other end of which extends through a lead 307 to the base 308 of the transistor 291. Comparably, the center tap 302 is also connected through a primary winding 309 $N_B$ duplicating the winding 306. A lead 311 connects the winding 309 to the base 312 of the transistor 297. Since all of the primary windings 293 $N_1$, 306 $N_A$, 309 $N_B$ and 299 $N_2$ are associated magnetically with the core 313 of a switching transformer 314 $T_s$, inductive transfer occurs to the secondary coils 237 $N_3$ and 246 $N_4$ also associated with the core 313 of the transformer 314.

The general operation of this circuit is as previously described. When an alternating voltage $V_i$ is impressed across the conductors 261 and 262 and when there is an alternating current flow $i_1$ in the conductors 207 and 208 through the primary coil 209, then there is a multiplication of the values of these two inputs resulting in a product which appears across the terminal 229 A and 232 B as indicated by the reading of the meter 234.

What is claimed is:

1. An electrical multiplier comprising a switching traansformer having a first core, a pair of primary switching windings disposed in mirror symmetry on said first core, a voltage transformer having a second core, a primary voltage winding on said second core, a pair of secondary voltage windings disposed in mirror symmetry on said second core, a power supply having positive and negative terminals, a lead connecting the adjacent ends of said secondary voltage windings to said negative terminal, a pair of conductors joining each of the opposite ends of said secondary voltage windings to the respective opposite ends of said primary switching winding, a pair of primary transistors, means for connecting the bases of said primary transistors to said negative terminal, means for separately connecting the adjacent ends of said primary switching windings through the collector and emitter of individual ones of said primary transistors to said positive terminal, a pair of secondary switching windings disposed in mirror symmetry on said first core, a current transformer having a third core, a primary current winding on said third core, a secondary current winding on said third core and having a first terminal and a second terminal, a pair of secondary transistors, means for connecting one end of one of said secondary switching windings to the collectors of said pair of secondary transistors, means for connecting the other end of said one of said secondary switching windings to the bases of said pair of secondary transistors, a pair of tertiary transistors, means for connecting one end of the other of said secondary switching windings to the collectors of said tertiary transistors, means for connecting the other end of the other of said secondary switching windings to the base of said tertiary transistors, means for connecting said first terminal to the emitter of one of said secondary transistors and to the emitter of one of said tertiary transistors, a pair of output terminals, a conductor joining one of said output terminals to the emitter of the other secondary transistor, a lead joining the other of said output terminals to the emitter of the other tertiary transistor, a first resistor, a second resistor matching said first resistor, means connecting said first resistor in a conducting path between said emitter of said other secondary transistor and said second terminal, means connecting said second resistor in a conducting path between said emitter of said other tertiary transistor and said second terminal, and an output meter connected across said first and second resistors.

2. An electrical multiplier as in claim 1 in which a third resistor is connected to said first terminal and said second terminal.

3. An electrical multiplier comprising a switching transformer having a single core, a pair of primary switching windings on said core, means responsive to the flux condition of said core for alternately energizing said primary switching windings at a predetermined frequency during two successive time periods, means for varying the duration of said periods with respect to each other in accordance with the magnitude of an impressed voltage, a pair of secondary switching windings on said core, an output meter, a source of current alternating at said frequency, and means controlled by said secondary switching windings for connecting said source of current and said output meter in opposite senses and at said frequency for affording a substantially unidirectional voltage drop across said meter proportional to said impressed voltage and said current.

4. An electrical multiplier comprising a switching transformer having a single core, a pair of primary switching windings on said core, a source of electromotive force alternating in direction of voltage drop at a predetermined frequency, means for impressing a fraction of said voltage drop on one of said primary switching windings in one sense, means for impressing an equal fraction of said voltage drop on the other of said primary switching windings in an opposite sense, means for alternately subjecting said primary switching windings to their respective fractions of said voltage drop at a rate many times said predetermined frequency, a pair of secondary switching windings on said core, a source of current alternating at said predetermined frequency, an output meter, means for conducting a fraction of said current to one terminal of said meter through one path, means for conducting an equal fraction of said current to the other terminal of said meter through another path, and means controlled by said secondary switching windings for rendering said paths alternately effective.

5. An electrical multiplier comprising first means subjected to a voltage alternating in direction at a predetermined frequency, second means subjected to a current alternating in direction at said frequency, a switching transformer having a single core, a pair of primary switching windings on said core, a local source of voltage difference, means for alternately subjecting said primary switching windings to said local voltage difference at a rate many times said frequency and in opposite senses, means for impressing a fraction of said voltage across said first means on one of said primary switching windings to be added therein to said local voltage difference therein, means for impressing an equal fraction of said voltage across said first means on the other of said primary switching windings to be subtracted therein from said local voltage difference therein, a pair of secondary switching windings on said core, an output meter having two terminals, means for conducting a fraction of said current in said second means through one path to one terminal of said meter, means for conducting an equal fraction of said current in said second means through another path to the other terminal of said meter, and means controlled by said secondary switching windings for rendering said paths alternately effective.

6. An electical multiplier comprising a source of voltage alternating at a frequency, a switching transformer having a single saturable core, a pair of primary switching windings on said core, means for alternately supplying energy to said windings substantially to saturate said core, means for adding an increment to said energy for the energization of one of said switching windings and for subtracting an equal increment from said energy for the energization of the other of said switching windings, said increments being proportional to instantaneous values of said alternating voltage, a source of current alternating at said frequency, a pair of secondary switching windings on said core, an output meter, and means including said secondary switching windings for conducting current from said source unidirectionally through said output meter.

7. An electrical multiplier comprising a source of voltage alternating at a frequency, a switching transformer having a core, a pair of primary switching windings on said core, a source of continuous voltage, means for energizing said primary switching windings alternately from said source of continuous voltage, means for dividing said alternating voltage into two halves, means for adding the instantaneous value of voltage of one of said halves to one of said primary switching windings, means for subtracting the substantially simultaneous instantaneous value of voltage of the other of said halves from the other of said primary switching windings, a source of current alternating at said frequency, an output meter, a pair of secondary switching windings on said core, and means controlled by said secondary switching winding for conducting current from said source alternately in two paths to affect said output meter unidirectionally.

8. An electrical multiplier comprising a source of voltage alternating at a predetermined frequency, a voltage transformer having a primary voltage winding and two equal secondary voltage windings, means for impressing said alternating voltage across said primary voltage winding, a switching transformer, a pair of primary switching windings on said switching transformer, a source of continuous voltage, means including windings on said switching transformer for energizing said primary switching windings alternately at a frequency higher than said predetermined frequency, means for additively energizing one of said primary switching windings in accordance with the instantaneous value of the voltage across one of said secondary voltage windings, means for subtractively energizing the other of said primary switching windings in accordance with the substantially simultaneous value of the voltage across the other of said secondary voltage windings, a source of current alternating at said predetermined frequency, a current transformer having a primary current winding and a secondary current winding, means for subjecting said primary current winding to said alternating current, a resistor shunting said secondary current winding, an output meter having two terminals, a pair of equal resistors joined at a midpoint and connected to said two terminals to shunt said output meter, means connecting one end of said secondary current winding to said midpoint, a pair of switching arrangements at one of their corresponding ends connected to the respective ones of said terminals, means for connecting the other end of said secondary current winding to the other corresponding ends of said switching arrangements, a pair of secondary switching windings on said switching transformer, and means connecting each of said secondary switching windings to control a respective one of said switching arrangements.

9. An electrical multiplier comprising a switching transformer having a single saturable core, a pair of primary switching windings on said core, means for subjecting each of said primary switching windings to a respective one of two equal portions of an unknown alternating voltage substantially saturating said core in opposite directions, means for modulating the saturation of said core by impressing a local voltage across one of said primary switching windings in a sense to be added to said portion of said unknown voltage therein and by impressing said local voltage across the other of said primary switching windings in a sense to be subtracted from said portion of said unknown voltage therein, an output meter having two terminals, a current winding, a pair of equal resistors joined at a midpoint and connected to said two terminals to shunt said output meter, means for connecting one end of said current winding to said midpoint, means connecting the other end of said current winding through a first switching arrangement to one of said terminals, means connecting the other end of said current winding through a second switching arrangement to the other of said terminals, means including one secondary switching winding on said core for controlling said first switching arrangement, and means including another switching winding on said core for controlling said second switching arrangement.

10. An electrical multiplier comprising a switching transformer having a saturable core, a pair of primary switching windings on said core, means effective at a relatively high frequency for subjecting said primary switching windings alternately to a predetermined voltage substantially to saturate said core alternately in opposite directions, means alternately effective at a relatively low frequency for impressing one selected fraction of an unknown voltage on one of said primary switching windings in a sense to be added to said predetermined voltage and for impressing an equal fraction of said unknown voltage on the other of said primary switching windings in a sense to be subtracted from said predetermined voltage, a pair of secondary switching windings on said core, an output device, a source of current alternating at said relatively low frequency, and means controlled by said secondary switching windings for conducting current from said source unidirectionally through said output device.

References Cited by the Examiner
UNITED STATES PATENTS 2,808,990  10/1957  Van Allen.
2,979,263   4/1961  Keister _____ 235—194
3,010,069  11/1961  Mills et al. _____ 235—194

MALCOLM A. MORRISON, *Primary Examiner.*